(12) United States Patent
Fukukawa et al.

(10) Patent No.: US 7,631,936 B2
(45) Date of Patent: Dec. 15, 2009

(54) RECLINING APPARATUS AND AUTOMOTIVE SEAT PROVIDED WITH THE SAME

(75) Inventors: Takao Fukukawa, Hamamatsu (JP); Masaaki Takii, Hamamatsu (JP); Hiroshi Yokoyama, Yokohama (JP); Nobuhito Kanae, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 265 days.

(21) Appl. No.: 11/677,285

(22) Filed: Feb. 21, 2007

(65) Prior Publication Data
US 2007/0194616 A1    Aug. 23, 2007

(30) Foreign Application Priority Data
Feb. 23, 2006    (JP)    ............... 2006-046177

(51) Int. Cl.
*B60N 2/02*    (2006.01)
(52) U.S. Cl. ............ 297/292; 297/301.3; 297/374; 297/354.12; 297/361.1
(58) Field of Classification Search ........ 297/292, 297/301.3, 361.1–378.12
See application file for complete search history.

(56) References Cited

U.S. PATENT DOCUMENTS 6,705,677 B2 * 3/2004 Oshima et al. ........... 297/300.2
7,077,471 B2 * 7/2006 Schumann et al. ....... 297/216.1

FOREIGN PATENT DOCUMENTS

JP    1-107708    4/1989
JP    6-58740    8/1994

* cited by examiner

*Primary Examiner*—Laurie K Cranmer
(74) *Attorney, Agent, or Firm*—Cozen O'Connor

(57) ABSTRACT

The invention provides a reclining apparatus which can make a width of an apparatus small. The reclining apparatus of the present invention is provided with a first bracket (1) attached to a seat back (10), a second bracket (2) attached to a seat cushion (11), a first shaft (3) forming a rotation center of the first bracket (1), a spiral spring (5) spirally wound around the first shaft (3) and biasing a rotation in a forward direction of the first bracket (1), and a rotary damper (6) decelerating a rotating speed of the first bracket (1) against an biasing force of the spiral spring (5). The rotary damper (6) and the spiral spring (5) are arranged in parallel, and an arm (7) rotating a casing (6a) of the rotary damper (6) on the basis of a rotation of the first bracket (1) is provided between the rotary damper (6) and the second bracket (2).

2 Claims, 2 Drawing Sheets

RECLINING APPARATUS AND AUTOMOTIVE SEAT PROVIDED WITH THE SAME

BACKGROUND OF THE INVENTION

1. Field of the Invention

The present invention relates to a reclining apparatus and an automotive seat provided with the same.

2. Background of the Invention

For example, in Japanese Utility Model Laid-Open Disclosure No. 6-58740, there is disclosed a reclining apparatus provided with a first bracket attached to a seat back, a second bracket attached to a seat cushion, a first shaft forming a rotation center of the first bracket, a spiral spring spirally wound around the first shaft and biasing a rotation in a forward direction of the first bracket, and a rotary damper decelerating a rotating speed of the first bracket against an biasing force of the spiral spring.

However, in the reclining apparatus mentioned above, the structure is made such that the first shaft forming the rotation center of the first bracket is concentric with the second shaft forming the rotation center of a casing of the rotary damper, and the rotary damper is arranged in a further outer side of the spiral spring arranged in an outer side of the second bracket. In other words, since the structure is made such that the rotary damper and the spiral spring are arranged in series, there is a problem that a width of the apparatus cannot help being enlarged. For example, in a motor vehicle, it is general that an installation space of the reclining apparatus cannot be sufficiently secured between a seat and a vehicle body, and it is hard to install the reclining apparatus having a large width. On the other hand, in order to make the width of the reclining apparatus small, there can be considered that a thickness of the rotary damper is made thin. However, in this case, there is generated a problem that a braking characteristic of the rotary damper is lowered.

Patent Document 1: Japanese Patent Application Laid-Open Disclosure No. 1-107708

Patent Document 2: Japanese Utility Model Laid-Open Disclosure No. 6-58740

DESCRIPTION OF THE INVENTION

Problems to be Solved by the Invention

The present invention is made by taking the circumstances mentioned above into consideration, and an object of the present invention is to provide a reclining apparatus which can make a width of an apparatus small, and an automotive seat provided with the same.

Means for Solving the Problem

In order to solve the problem mentioned above, the present invention provides the following reclining apparatus and the following automotive seat.

1. A reclining apparatus comprising a first bracket attached to a seat back, a second bracket attached to a seat cushion, a first shaft forming a rotation center of the first bracket, a spiral spring spirally wound around the first shaft and biasing a rotation in a forward direction of the first bracket, and a rotary damper decelerating a rotating speed of the first bracket against an biasing force of the spiral spring, wherein the rotary damper and the spiral spring are arranged in parallel, and an arm rotating a casing of the rotary damper on the basis of a rotation of the first bracket is provided between the rotary damper and the second bracket.

2. An automotive seat comprising the reclining apparatus as recited in the item 1 mentioned above.

Effect of the Invention

In accordance with the invention described in the item 1 mentioned above, since the rotary damper and the spiral spring are arranged in parallel, it is possible to make the width of the apparatus smaller as compared with the conventional reclining apparatus. Further, since a limit to a thickness of the rotary damper is reduced by the parallel arrangement of the rotary damper and the spiral spring, it is possible to employ the rotary damper having a high braking characteristics.

Further, according to the present invention, since the arm rotating the casing of the rotary damper on the basis of the rotation of the first bracket is provided between the rotary damper and the second bracket, the first bracket is rotated in the forward direction, whereby the casing of the rotary damper is rotated. Accordingly, the rotary damper generates the braking force against the biasing force of the spiral spring, thereby decelerating the rotating speed of the first bracket on the basis of the braking force.

In accordance with the present invention described in the item 2 mentioned above, even in the case where the installation space of the reclining apparatus formed with respect to the vehicle body is narrow, it is possible to install the automotive seat provided with a reclining function achieved by a combination of the spiral spring and the rotary damper.

DESCRIPTION OF REFERENCE NUMERALS

Figure 1:
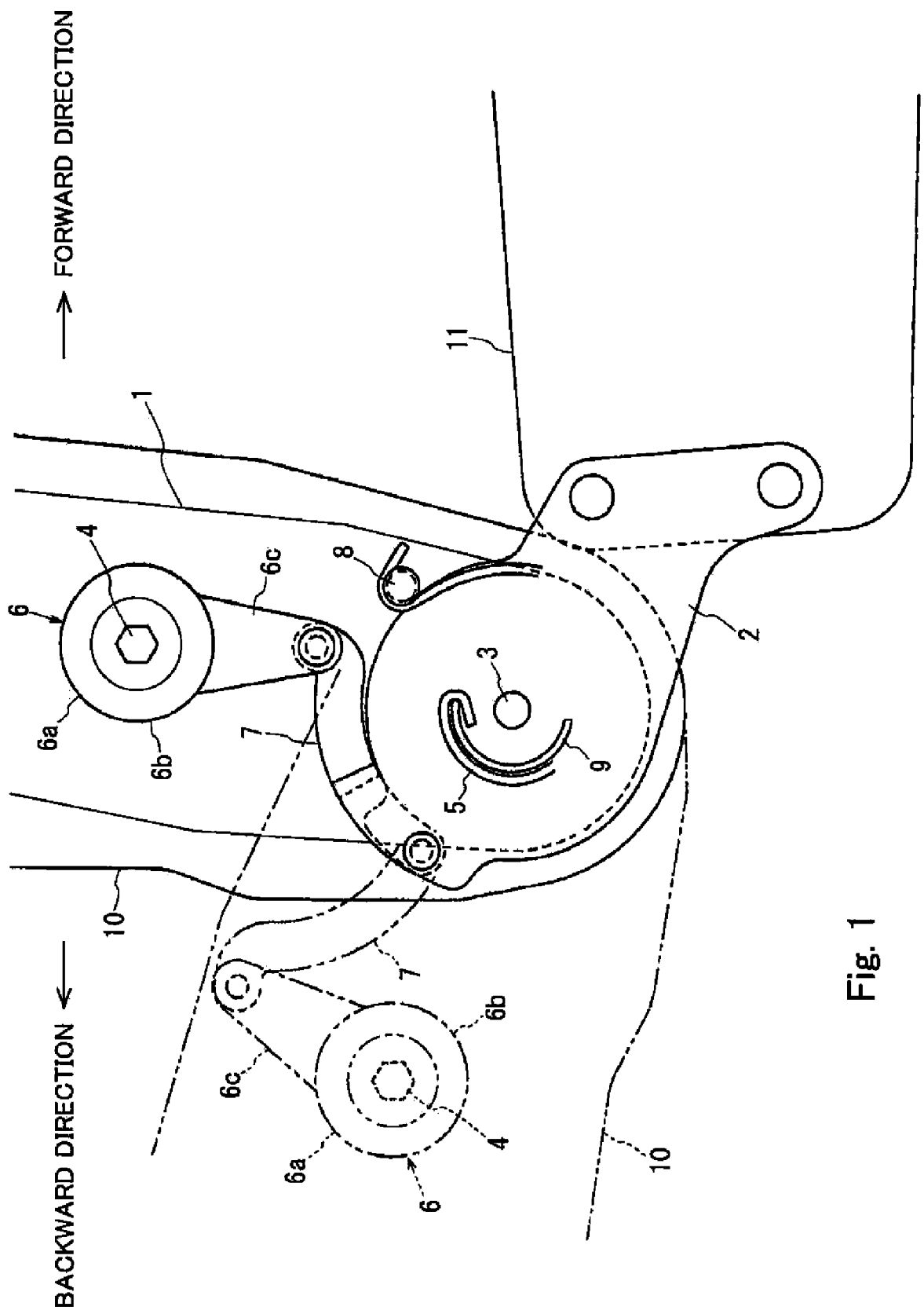
FIG. 1 is a schematic view showing a main portion of a reclining apparatus in accordance with an embodiment of the present invention.

1 First bracket
2 Second bracket
3 First shaft
4 Second shaft
5 Spiral spring
6 Rotary damper
6a Casing
6b Main body portion
6c Collar portion
7 Arm
8 First locking portion
9 Second locking portion
10 Seat back
11 Seat cushion

BEST MODE OF CARRYING OUT THE INVENTION

A description will be given below of a mode for carrying out the present invention on the basis of an embodiment shown in the drawings. In this case, in the following description, a subject to which a reclining apparatus in accordance with the present invention is applied is set to an automotive seat, however, the reclining apparatus in accordance with the present invention can be applied to the other seats (for example, a seat for the other vehicles than a motor vehicle, a seat for an aircraft, a seat for a ship and the like) than the automotive seat.

EMBODIMENT

Figure 2:
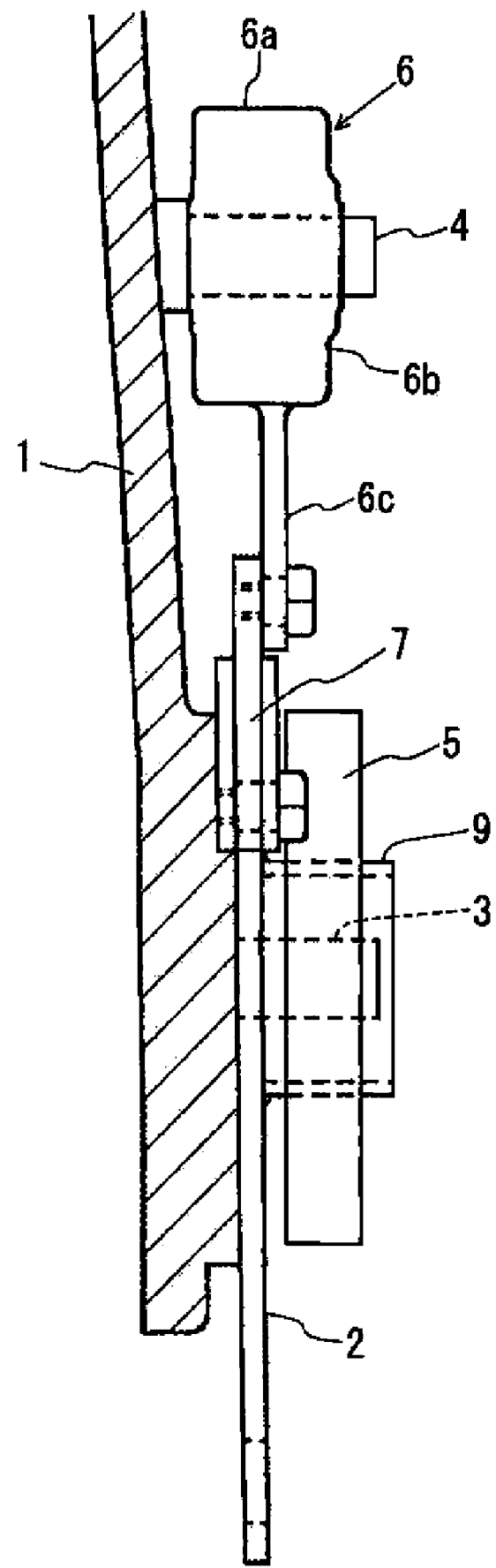
FIG. 2 is a schematic view showing the main portion of the reclining apparatus in accordance with the embodiment of the present invention.

FIGS. 1 and 2 are schematic views showing a main portion of a reclining apparatus in accordance with an embodiment of the present invention. As shown in these drawings, the reclining apparatus in accordance with the present embodiment is structured such as to have a first bracket 1, a second bracket 2, a first shaft 3, a spiral spring 5, a rotary damper 6 and an arm 7.

The first bracket 1 is attached to a side surface of a seat back 10. The second bracket 2 is attached to a side surface of a seat cushion 11. The first bracket 1 and the second bracket 2 are coupled by the first shaft 3, and the first bracket 1 is rotatable around the first shaft 3.

The spiral spring 5 is spirally wound around the first shaft 3. One end of the spiral spring 5 is connected to a second locking portion 9 provided in the second bracket 2, and the other end of the spiral spring 5 is connected to a first locking portion 8 provided in the first bracket 1. The spiral spring 5 arranged as mentioned above is wound up so as to store an biasing force on the basis of a movement of the first locking portion 8 in accordance with a rotation in a backward direction of the first bracket 1.

The rotary damper 6 is supported to a second shaft 4 provided in the first bracket 1. The second shaft 4 has a different axis from the first shaft 3, and is provided at a position with a predetermined distance away from the first shaft 3. Further, the second shaft 4 forms a rotation center of a casing 6a of the rotary damper 6.

As the rotary damper 6, it is possible to employ, for example, a structure in which a viscous body such as a grease or the like is filled between facing surfaces of a movable member and a fixed member provided within the casing 6a, and a viscous resistance of the viscous body is generated on the basis of a mutual displacement between the facing surfaces generated by the rotation of the casing 6a. Further, in addition to these, the rotary damper 6 can employ a structure in which a viscous liquid such as a silicone oil or the like is filled within the casing 6a, and the viscous liquid is pressed by a pressing member on the basis of the rotation of the casing 6a, thereby generating a resistance of the viscous liquid.

The casing 6a of the rotary damper 6 is structured such as to have an approximately circular main body portion 6b, and a collar portion 6c protruding from the main body portion 6b.

The rotary damper 6 and the spiral spring 5 are arranged in parallel as shown in FIGS. 1 and 2. As mentioned above, since the rotary damper 6 is supported to the second shaft 4 provided in the first bracket 1, the first bracket 1 is rotated, whereby the rotary damper 6 itself is moved around the spiral spring 5.

The arm 7 is provided between the rotary damper 6 and the second bracket 2. The arm 7 is structured such that one end is connected to the second bracket 2, and the other end is connected to the collar portion 6c constructing the casing 6a of the rotary damper 6. The arm 7 provided as mentioned above is structured such as to oscillate by setting the connection portion to the second bracket 2 as a supporting point, in correspondence to a motion of the rotary damper 6 moving around the spiral spring 5. Further, since the arm 7 exists between the rotary damper 6 and the second bracket 2, the arm 7 is oscillated in correspondence to the rotation of the first bracket 1, and the casing 6a of the rotary damper 6 is rotated around the second shaft 4 (refer to FIG. 1).

In the case where the reclining apparatus structured as mentioned above is applied to the seat arranged in the motor vehicle, the seat back 10 can be rotated by operating an operation lever (not shown) of the reclining apparatus so as to release an engagement between a gear (not shown) and a ratchet (not shown). If the engagement between the gear and the ratchet is released in a state in which the seat back 10 is reclined backward, the first bracket 1 is rotated in a forward direction on the basis of the biasing force of the spiral spring 5, and the seat back 10 is rotated in the same direction in accordance therewith. At this time, the arm 7 is oscillated by setting the connection portion to the second bracket 2 as a supporting point in correspondence to the motion of the rotary damper 6 moving around the spiral spring 5, and the casing 6a of the rotary damper 6 is rotated around the second shaft 4. Accordingly, the rotary damper 6 generates a braking force against the biasing force of the spiral spring 5, and it is possible to decelerate the rotating speed of the first bracket 1 and the seat back 10 to which the first bracket 1 is attached.

As described above, in accordance with the reclining apparatus on the basis of the present embodiment, since the rotary damper 6 and the spiral spring 5 are arranged in parallel, it is possible to make the width of the apparatus smaller than the conventional reclining apparatus. Accordingly, in the case where the reclining apparatus mentioned above is applied to the automotive seat, even if the installation space of the reclining apparatus formed with respect to the vehicle body is narrow, it is possible to install the automotive seat provided with the reclining function achieved by combining the spiral spring 5 and the rotary damper 6.

Further, whichever the rotary damper utilizes the viscous resistance of the viscous body mentioned above, or utilizes the resistance of the viscous liquid mentioned above, the rotary damper can generally increase the facing area between the movable member and the fixed member and increase an amount of the viscous liquid in accordance with an enlargement of the thickness of the casing. Accordingly, it is possible to increase a braking characteristic of the rotary damper. In this regard, in accordance with the reclining apparatus on the basis of the present embodiment, since the rotary damper 6 and the spiral spring 5 are arranged in parallel, whereby the limitation to the thickness of the rotary damper is alleviated, it is possible to employ the rotary damper having the high braking characteristic.

What is claimed is:

1. A reclining apparatus comprising:
a first bracket to be attached to a seat back;
a second bracket to be attached to a seat cushion;
a first shaft to connect said first bracket to said second bracket, around which said first bracket moves rotationally;
a spiral spring to give momentum to rotational movement of said first bracket in a forward direction; and
a rotary damper to reduce a speed of rotation of said first bracket against the momentum force of said spiral spring;
wherein said first bracket is provided with a second shaft in a position by a specified distance far from said first shaft, wherein said spiral spring is wound around said first shaft in a vortex-like manner, and wherein said rotary damper is supported by said second shaft, and further comprising an arm one end of which is coupled to said second bracket and another end of which is coupled to a casing of said rotary damper and, which rotates, when said first bracket moves rotationally, said casing around said second shaft.

2. An automotive seat comprising the reclining apparatus as described in claim 1.

* * * * *